(12) United States Patent
Xing

(10) Patent No.: US 12,331,873 B1
(45) Date of Patent: Jun. 17, 2025

(54) MULTIFUNCTIONAL STORAGE STAND

(71) Applicant: Shenzhen Chengzao Technology Co., Ltd., Guangdong (CN)

(72) Inventor: Kai Xing, Guangdong (CN)

( * ) Notice: Subject to any disclaimer, the term of this patent is extended or adjusted under 35 U.S.C. 154(b) by 0 days.

(21) Appl. No.: 18/891,722

(22) Filed: Sep. 20, 2024

(30) Foreign Application Priority Data

Jul. 25, 2024 (CN) .......................... 202411004805.3

(51) Int. Cl.
*F16M 11/00* (2006.01)
*F16M 11/20* (2006.01)
*F16M 11/38* (2006.01)

(52) U.S. Cl.
CPC ..... *F16M 11/2021* (2013.01); *F16M 11/2085* (2013.01); *F16M 11/00* (2013.01); *F16M 11/38* (2013.01); *F16M 2200/024* (2013.01)

(58) Field of Classification Search
CPC ........ F16M 11/00; F16M 11/06; F16M 11/10; F16M 11/24; F16M 11/38; A47F 5/103
USPC .......... 248/121, 122.1, 123.11, 123.2, 125.9, 248/130, 133, 136, 150, 371, 447, 448, 248/451, 454, 458, 460; 211/103, 193
See application file for complete search history.

(56) References Cited

U.S. PATENT DOCUMENTS

| | | | | |
|---|---|---|---|---|
| 4,879,965 A | * | 11/1989 | Valley | G09F 7/22 116/63 R |
| 5,518,224 A | * | 5/1996 | Anderson | B66F 7/0641 254/131 |
| 6,000,663 A | * | 12/1999 | Plasse | A01G 5/02 248/447 |
| 8,191,852 B1 | * | 6/2012 | Wheatley | B29C 39/025 248/677 |
| 11,448,361 B1 | * | 9/2022 | Dorame, Jr. | F16M 11/38 |
| 2008/0302926 A1 | * | 12/2008 | Cheng | F16M 13/02 248/161 |
| 2014/0084116 A1 | * | 3/2014 | Brunard | F16M 13/02 248/122.1 |
| 2021/0307187 A1 | * | 9/2021 | Pan | F16M 11/26 |

* cited by examiner

*Primary Examiner* — Alfred J Wujciak

(57) ABSTRACT

A multifunctional storage stand comprises a first side stand and a second side stand arranged opposite to each other, the first side stand and the second side stand have the same structure, the first side stand comprises a base stand, two ends of the base stands are connected by bottom connecting rods, one end of the base stand is rotatably connected to an adjusting arm, the adjusting arm is connected to the base stand through an angle positioning mechanism, tops of the adjusting arms are connected by a top connecting rod, an expansion slot is arranged at a middle of the adjusting arm away from one side where the adjusting arm is connected to the base stand. The multifunctional storage stand of the invention can accommodate tablets or laptops, headphones, and keyboards, increasing the types of items that can be stored and enhancing convenience of use.

8 Claims, 6 Drawing Sheets

ND STAND

1. TECHNICAL FIELD

The invention relates to the technical field of daily necessities, in particular to a multifunctional storage stand.

2. BACKGROUND ART

Currently, desktop stand products on the market tend to have relatively simple functions and modes of use, resulting in serious product homogeneity. Existing desktop stands typically support only one type of device, such as tablets or laptops, and lack additional storage features. Users often need to purchase additional accessories separately to headphones or keyboards. These desktop stand products cannot meet usage needs.

3. Summary of the Invention

To solve the above technical problems, the invention provides the following technical scheme: a multifunctional storage stand comprises a first side stand and a second side stand arranged opposite to each other, the first side stand and the second side stand have the same structure, the first side stand comprises a base stand, two ends of the base stands are connected by bottom connecting rods, one end of the base stand is rotatably connected to an adjusting arm, the adjusting arm is connected to the base stand through an angle positioning mechanism, tops of the adjusting arms are connected by a top connecting rod, an expansion slot is arranged at a middle of the adjusting arm away from one side where the adjusting arm is connected to the base stand, at one end where the base stand is connected to the adjusting arm, its inner side is provided with a bottom support member for relative rotation, the top of the adjusting arm is rotatably provided with a top support member, and an additional support member is also arranged on the top connecting rod.

Further, the end of the base stand is provided with a rotation hole for connecting the adjusting arm, a bottom of the adjusting arm is provided with a through hole corresponding to the rotation hole, the through hole on the adjusting arm is connected to the rotation hole through a connecting bolt and a washer.

Further, the angle positioning mechanism comprises adjusting tooth grooves arranged on an outer edge of the bottom of the adjusting arm along the rotation path of the adjusting arm, a moving hole is correspondingly arranged on the base stand, a clamping block that engages with the adjusting tooth groove is retractably arranged in the moving hole, one end of the clamping block located on an outer side of the base stand is connected to a pressing head, and the other end is connected to a clamping block temporary storage cavity through a plurality of springs.

Further, the bottom support members and the top support members have the same structure, the bottom support member comprises a main support rod connected to the adjusting arm, one end of the main support rod is provided with a connecting hole, the other end is inclined upwards and provided with an upper inclined support rod, a lower part of the upper inclined support rod is provided with a hanging hole.

Further, an inner side of the adjusting arm is provided with a thread groove corresponding to the connecting hole, the connecting hole on the bottom support member is connected to the thread groove through a locking bolt.

Further, the upward inclined support rod is embedded with a tritium tube.

Further, the additional support member comprises a connecting sleeve sleeved on the top connecting rod, the connecting sleeve is connected to a support plate on one side away from the adjusting arms, upper surfaces of the support plate, the bottom support members and the top support members are all equipped with silicone pads.

Further, the top connecting rod and the bottom connecting rod are telescopic rods.

Further, a middle part of the base stand is upwardly provided with a keyboard placement block.

Compared with the prior art, the invention has the following advantages: the multifunctional storage stand of the invention can accommodate tablets or laptops, headphones, and keyboards, increasing the types of items that can be stored and enhancing convenience of use; the storage stand can accommodate multiple devices, improving desktop neatness; by setting the adjustable arms, the top support members, and the bottom support members, users can adjust the angle and position of the stand according to their needs, thereby increasing the product's flexibility and usability; the extended holes are reserved, so that users to purchase additional accessories as needed, enabling more storage capabilities.

4. BRIEF DESCRIPTION OF ACCOMPANY DRAWINGS

5. SPECIFIC EMBODIMENT OF THE INVENTION

Figure 1:
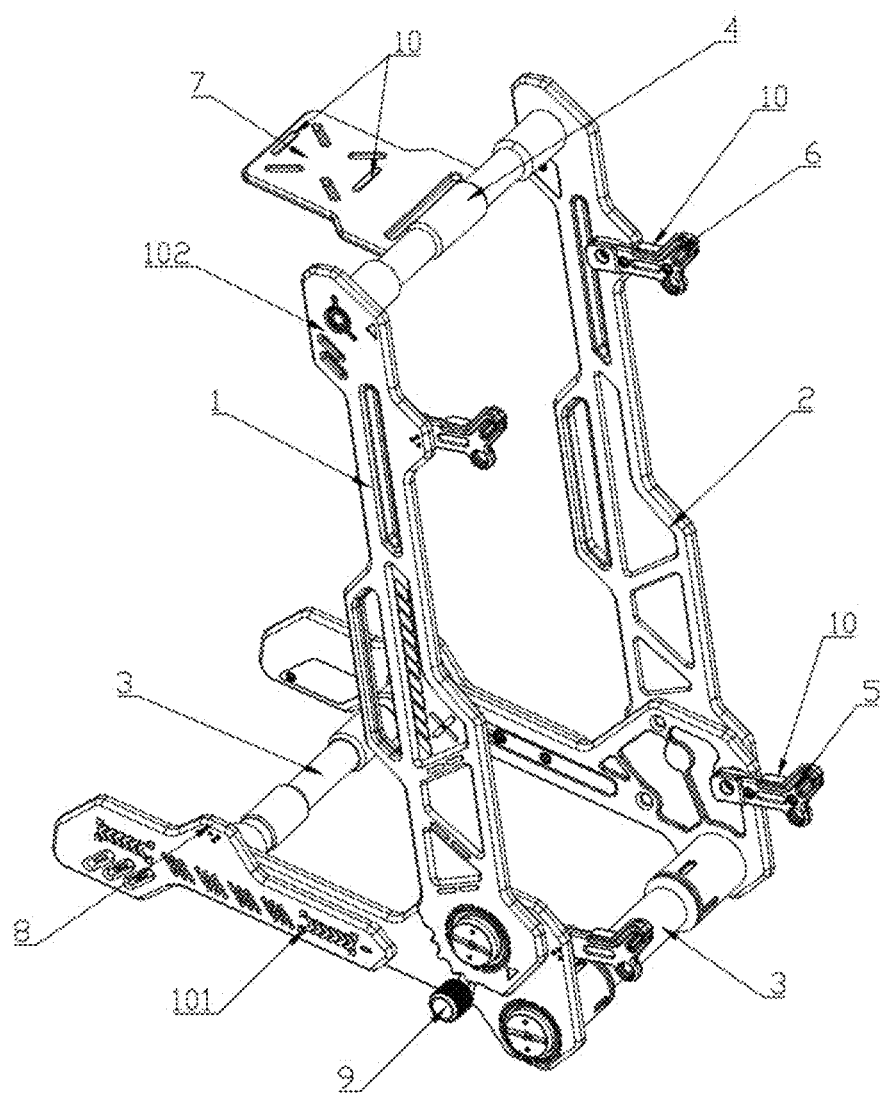
FIG. 1 is a schematic front view of the multifunctional storage stand of the invention.

In order to make the objects, technical schemes and advantages of the embodiments of the invention clearer, the technical schemes in the embodiments of the invention will be clearly and completely described below in combination with the accompanying drawings in the embodiments of the invention, obviously, the described embodiments are some, but not all embodiments of the invention. The components of the embodiments of the invention generally described and illustrated in the drawings herein may be arranged and designed in a variety of different configurations.

In the description of the invention, it should be understood that the orientation or positional relationship indicated by the terms "center", "upper", "lower", "left", "right", "vertical", "horizontal", "inner", "outer" and so on are based on the orientation or positional relationship shown in the accompanying drawings, or the orientation or positional relationship that product of the invention is usually placed in when it is used, only for the convenience of describing the invention and simplifying the description, rather than indicating or implying that the indicated device or element must have a specific orientation, as well as a specific orientation structure and operation, therefore, it should not be construed as a limitation of the invention. In addition, the terms of "first", "second", "third" and so on are only used to differentiate the description, and should not be construed as indicating or implying relative importance.

In addition, if the terms "horizontal", "vertical", "overhanging" and other terms appear, it does not mean that the component is required to be absolutely horizontal or overhanging, but can be slightly inclined. For example, "horizontal" simply means that its direction is more horizontal than "vertical", it does not mean that the structure must be completely horizontal, but can be slightly inclined.

In the description of the invention, "a plurality of" means at least two.

In the description of the invention, it should also be noted that the terms of "arrange", "install", "link", "connect", etc., should be generally understood unless there are specific restrictions or stipulations, for example, the "connect" may refer to fixed connection, detachable connection or integral connection; the "connect" may also refer to mechanical connection or electrical connection; the means of "connect" may be directly connected or indirectly connected through an intermediate medium, and may be internal communication between the two elements. For those skilled in the art, the specific meaning of the above terms in the invention can be understood according to the specific situation.

Embodiment

Figure 2:
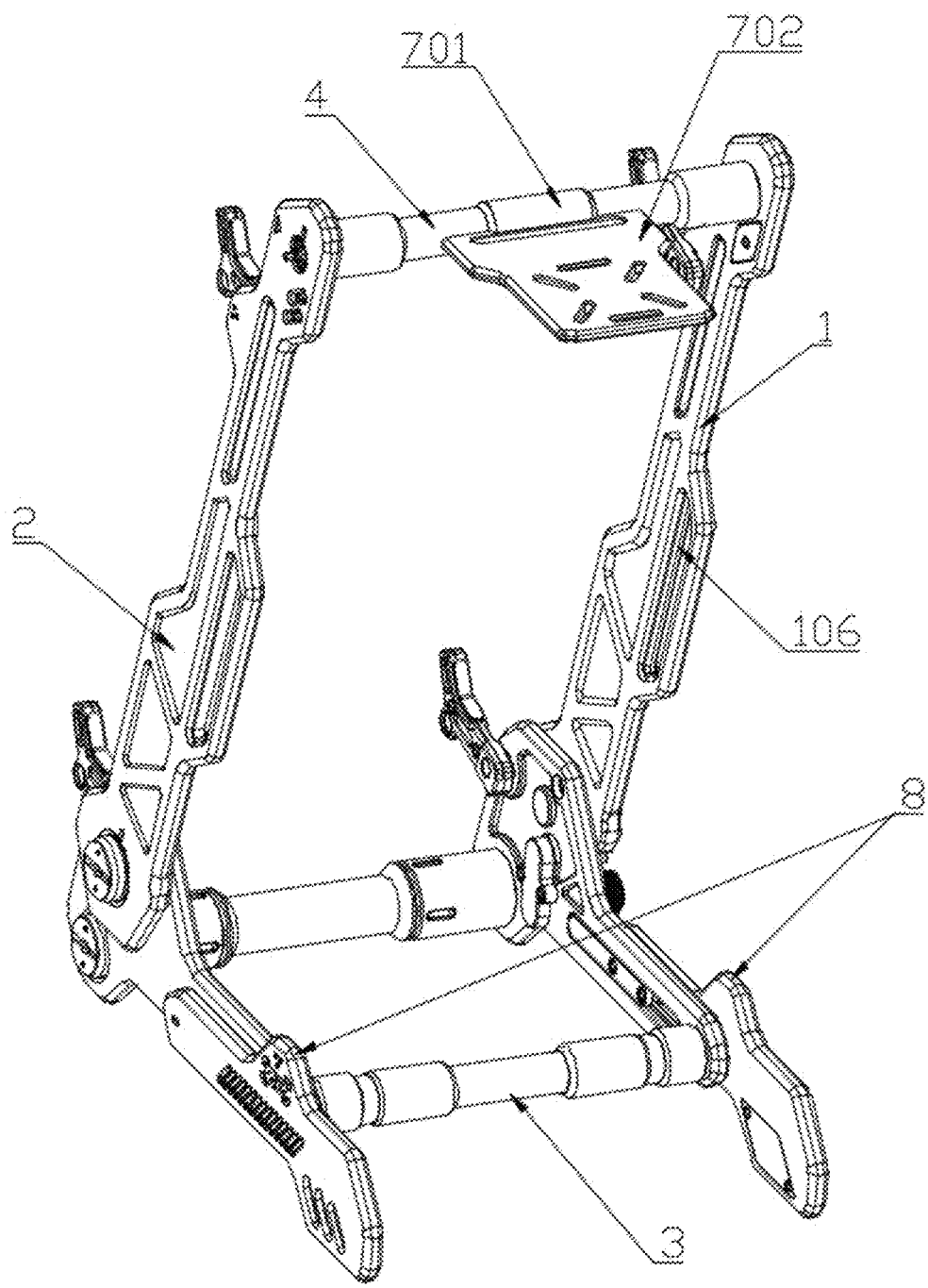
FIG. 2 is a schematic rear view of the multifunctional storage stand of the invention.
Figure 3:
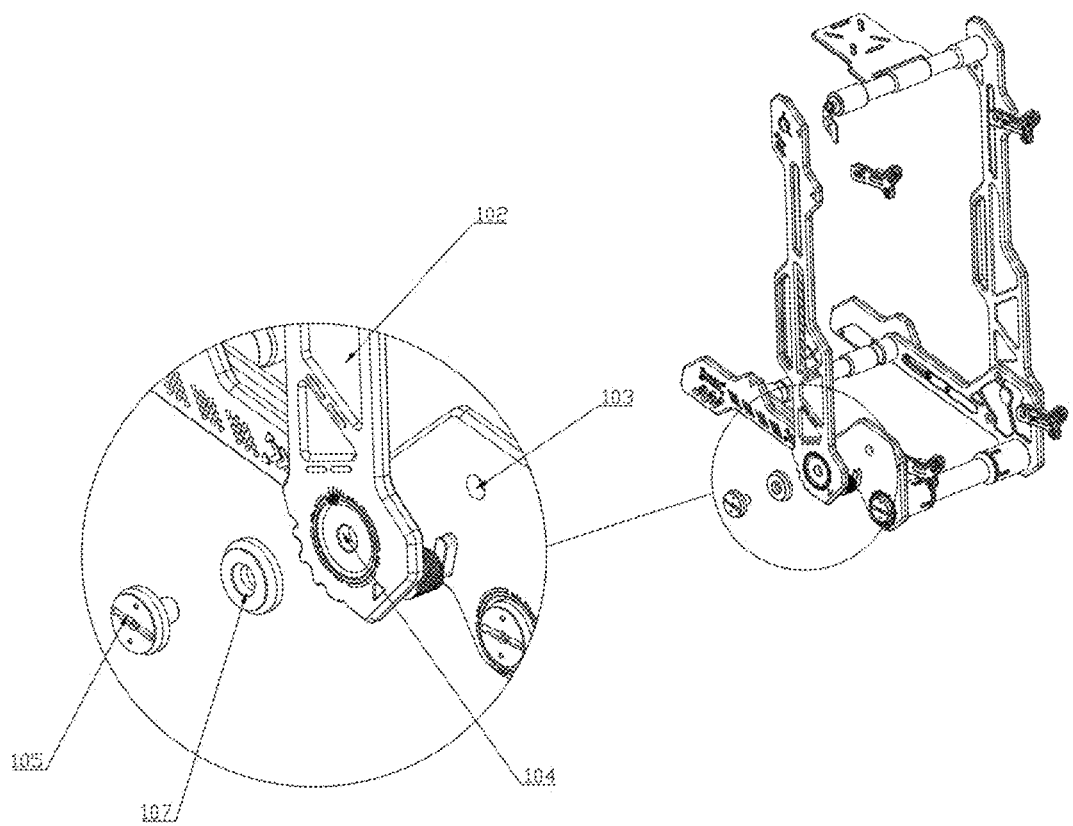
FIG. 3 is a schematic diagram of the connection structure between the adjusting arm and the base stand in the multifunctional storage stand of the invention.
Figure 4:
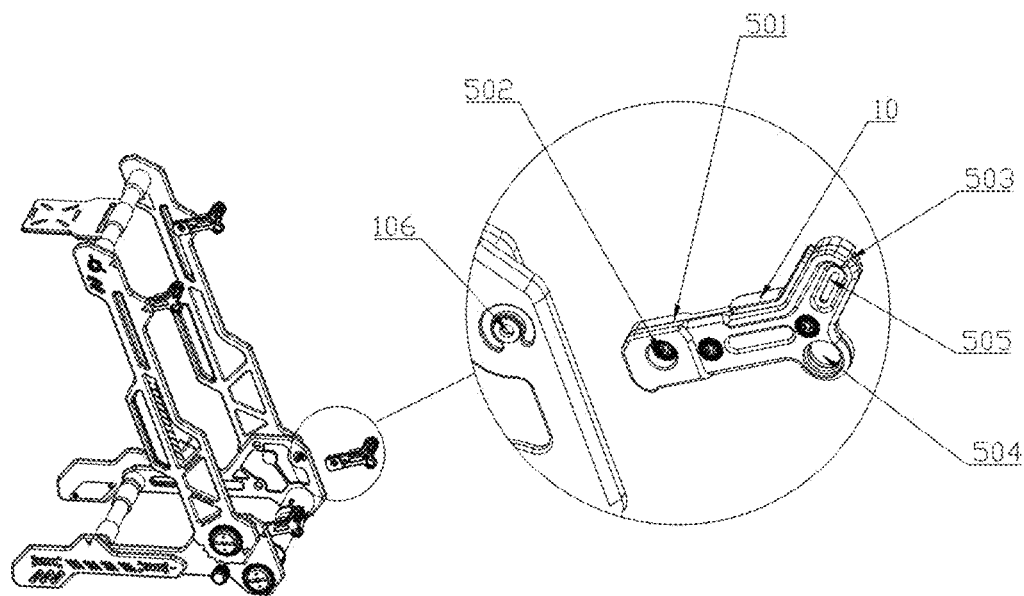
FIG. 4 is a schematic diagram of the connection structure between the bottom support member and the base stand in the multifunctional storage stand of the invention.
Figure 5:
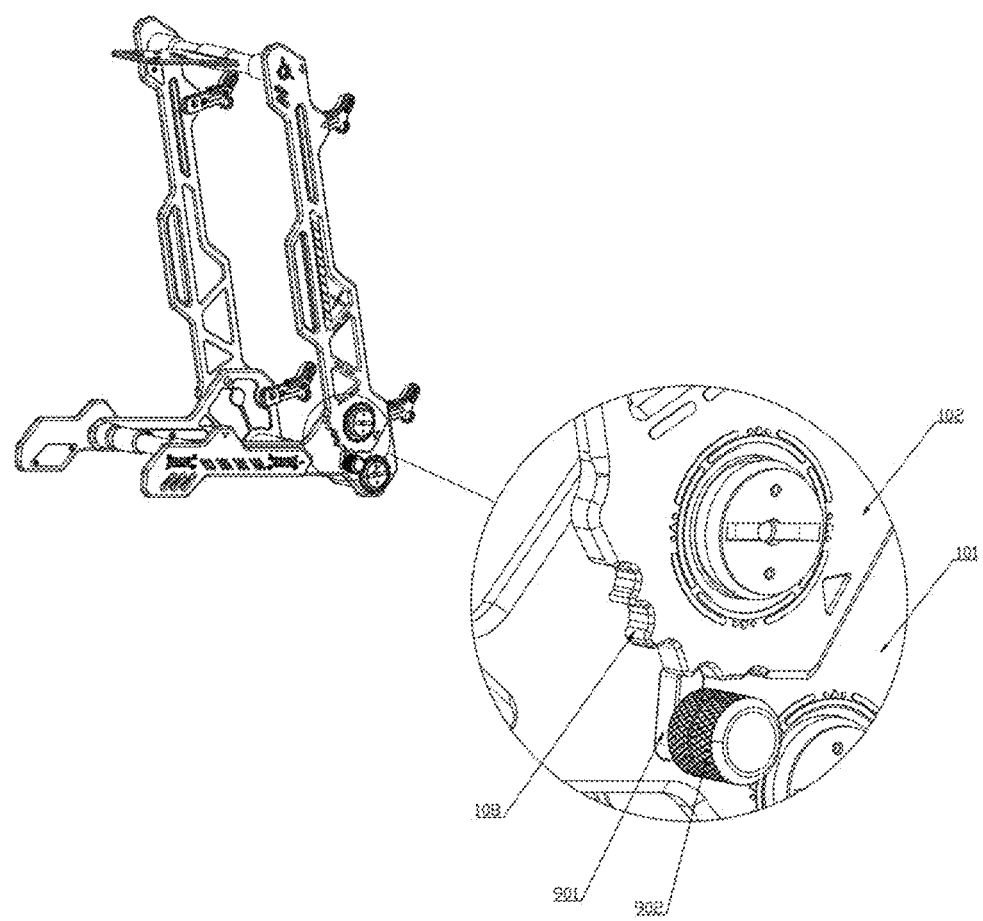
FIG. 5 is a schematic diagram of the structure of the angle positioning mechanism of the multifunctional storage stand of the invention.
Figure 6:
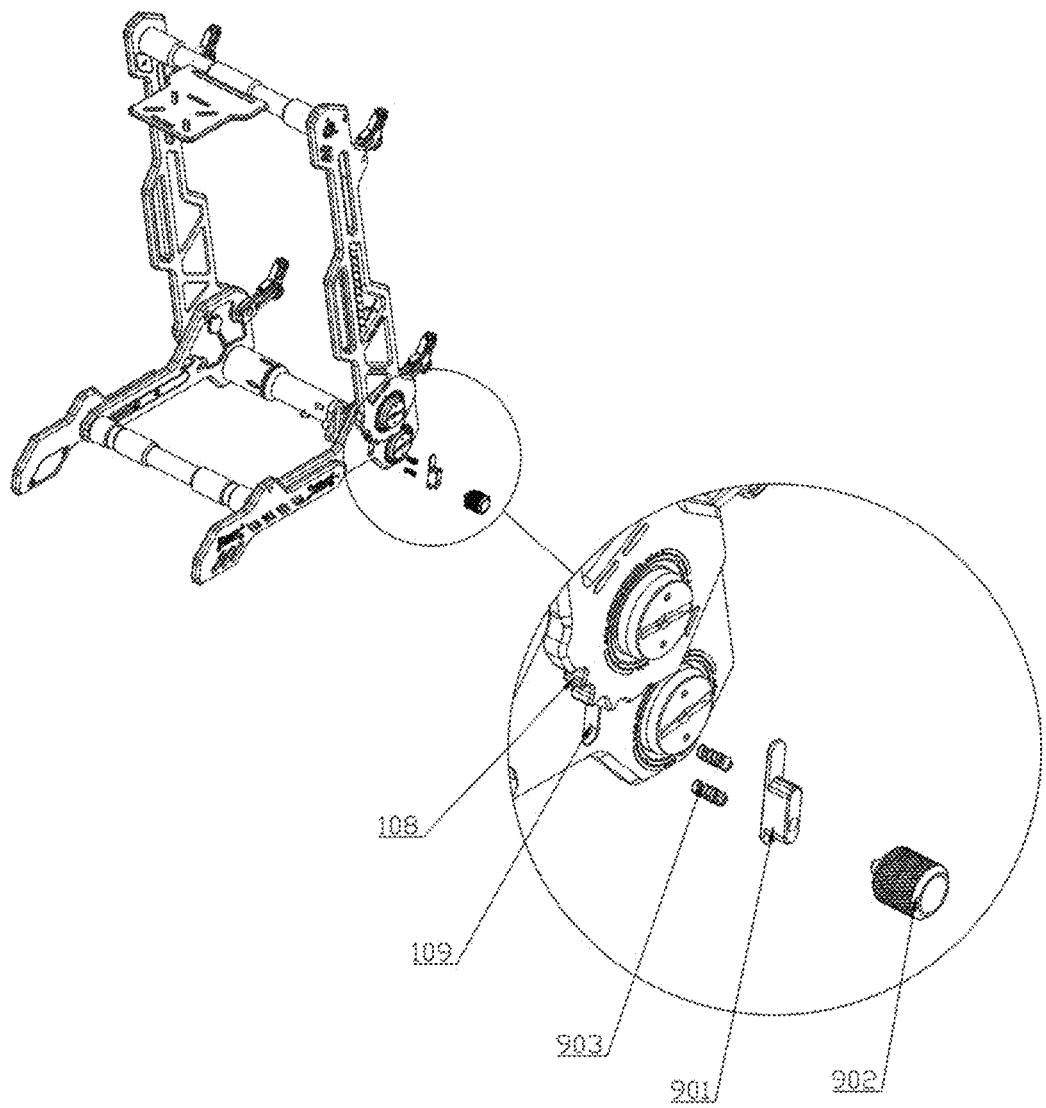
FIG. 6 is a schematic diagram of an outer disassembly of the angle positioning mechanism of the multifunctional storage stand of the invention.
Figure 7:
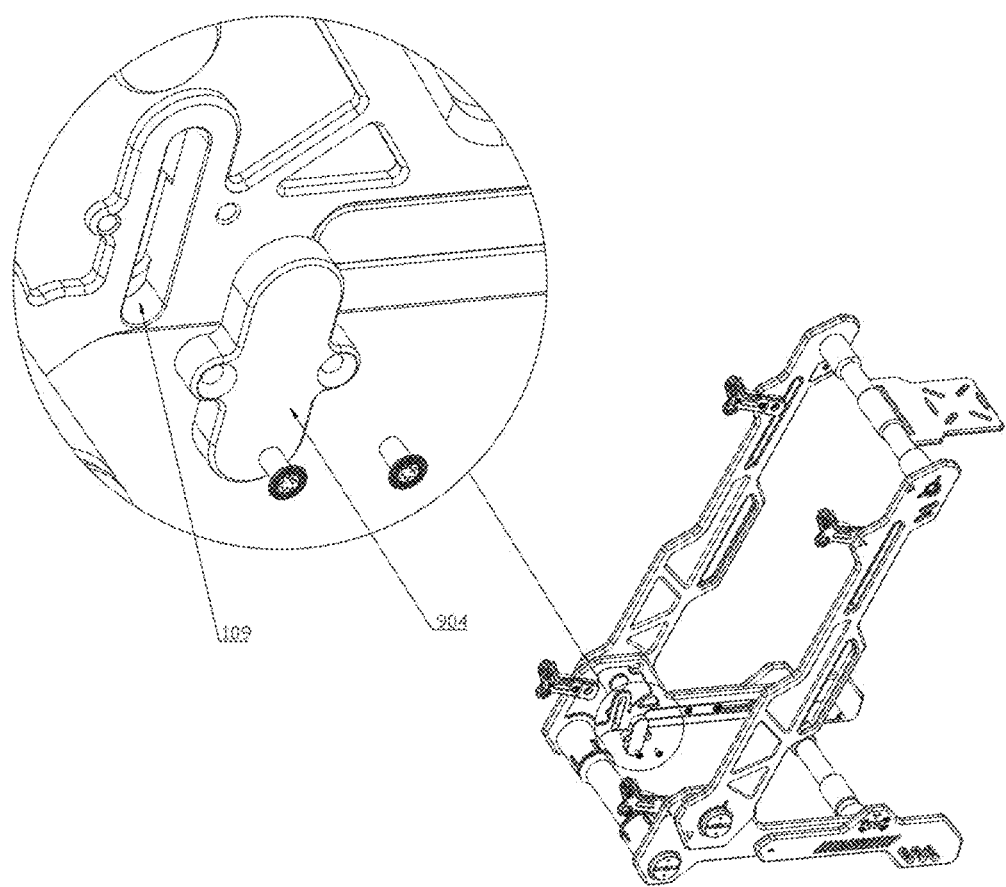
FIG. 7 is a schematic diagram of an inner disassembly of the angle positioning mechanism of the multifunctional storage stand of the invention.

Combined with FIG. 1-7, the invention provides the multifunctional storage stand, comprising a first side stand 1 and a second side stand 2 arranged opposite to each other, the first side stand 1 and the second side stand 2 have the same structure, the first side stand 1 comprises a base stand 101, two ends of the base stands 101 are connected by bottom connecting rods 3, one end of the base stand 101 is rotatably connected to an adjusting arm 102, the adjusting arm 102 is connected to the base stand 101 through an angle positioning mechanism 9, and the angle adjustment and fixation are realized through the angle positioning mechanism 9; tops of the adjusting arms 102 are connected by a top connecting rod 4, an expansion slot 106 is arranged at a middle of the adjusting arm 102 away from one side where the adjusting arm 102 is connected to the base stand 101, at one end where the base stand 101 is connected to the adjusting arm 102, its inner side is provided with a bottom support member 5 for relative rotation, the top of the adjusting arm 102 is rotatably provided with a top support member 6, the top support 6 can rotate 360°, an additional support member 7 is also arranged on the top connecting rod 4; the top connecting rod 4 and the bottom connecting rod 3 are telescopic rods.

The end of the base stand 101 is provided with a rotation hole 103 for connecting the adjusting arm 102, a bottom of the adjusting arm 102 is provided with a through hole 104 corresponding to the rotation hole 103, the through hole 104 on the adjusting arm 102 is connected to the rotation hole 103 through a connecting bolt 105 and a washer 107, the connecting bolt 105 has a quick release function, and a groove is arranged on its surface, which can be directly adjusted by using a coin.

The angle positioning mechanism 9 comprises adjusting tooth grooves 108 arranged on an outer edge of the bottom of the adjusting arm 102 along the rotation path of the adjusting arm 102, a moving hole 109 is correspondingly arranged on the base stand 101, a clamping block 901 that engages with the adjusting tooth groove 108 is retractably arranged in the moving hole 109, one end of the clamping block 901 located on an outer side of the base stand is connected to a pressing head 902, and the other end is connected to a clamping block temporary storage cavity 904 through a plurality of springs 903.

The bottom support members 5 and the top support members 6 have the same structure, the bottom support member 5 comprises a main support rod 501 connected to the adjusting arm 102, one end of the main support rod 501 is provided with a connecting hole 502, the other end is inclined upwards and provided with an upper inclined support rod 503, a lower part of the upper inclined support rod 503 is provided with a hanging hole 504; the upward inclined support rod 503 is embedded with a tritium tube 505; an inner side of the adjusting arm 102 is provided with a thread groove 106 corresponding to the connecting hole, the connecting hole 502 on the bottom support member 5 is connected to the thread groove 106 through a locking bolt.

The additional support member 7 comprises a connecting sleeve 701 sleeved on the top connecting rod 4, the connecting sleeve 701 is connected to a support plate 702 on one side away from the adjusting arms 102, the support plate 702 can realize 360° rotation. Upper surfaces of the support plate 702, the bottom support members 5 and the top support members 6 are all equipped with silicone pads 10. A middle part of the base stand 101 is upwardly provided with a keyboard placement block 8, so that the keyboard can be tilted and securely placed between the keyboard placement blocks 8 and the adjusting arms 102.

In specific embodiment, the storage stand can be made of aluminum alloy to ensure stability and durability of the stand; the angle positioning mechanism at the connection between the adjusting arm and the base stand can adjust the tilt angle of the adjusting arm, specifically: by pressing the pressing head to inwardly depress the clamping block, the clamping block disengages from the adjusting tooth groove at the bottom of the adjusting arm; the adjusting arm is rotated to the desired angle, then the pressing head is released, so that the clamping block springs out under the action of the springs and securely engages with another adjusting tooth groove on the adjusting arm; by adjusting the locking bolts at the connections between the top support member and the adjusting arm, and between the bottom support member and the adjusting arm, the tilt angles of the top support member and bottom support member are adjusted, facilitating support for tablets or laptops; by rotating the connecting sleeve attached to the top connecting rod, the angle of the support plate is adjusted, and an upper part of the support plate can be used to store headphones; the keyboard slots on the adjusting arms can be used to store a keyboard, the extended threaded holes on the base stands and the adjusting arms can be used to configure additional supports for storing other electronic products such as wireless headphones, smartwatches.

The invention and its embodiments are described above, this description is not restrictive, and what is shown in the accompanying drawing is only one of the embodiments of the invention, and the actual structure is not limited to this. All in all, if those skilled in the art receives its enlightenment, without deviating from the object of the invention, and without creatively designing structures and embodiments similar to the technical scheme of the invention shall fall within the protection scope of the invention.

The invention claimed is:

1. A multifunctional storage stand, comprising a first side stand and a second side stand arranged opposite to each other, the first side stand and the second side stand have the same structure, the first side stand comprises a base stand and the second stand comprises a base stand, two ends of the base stands are connected by bottom connecting rods, one end of each base stand is rotatably connected to an adjusting arm, each adjusting arm is connected to each base stand through an angle positioning mechanism, tops of the adjusting arms are connected by a top connecting rod, an expansion slot is arranged at a middle of each adjusting arm away from one side where the adjusting arm is connected to the base stand, at one end where each base stand is connected to each adjusting arm, its inner side is provided with a bottom support member for relative rotation, the top of each adjusting arm is rotatably provided with a top support member, and an additional support member is also arranged on the top connecting rod;

the bottom support members and the top support members have the same structure, each bottom support member comprises a main support rod connected to the adjusting arm, one end of the main support rod is provided with a connecting hole, the other end is inclined upwards and provided with an upper inclined support rod, a lower part of the upper inclined support rod is provided with a hanging hole.

2. The multifunctional storage stand of claim 1, wherein the end of the base stand is provided with a rotation hole for connecting the adjusting arm, a bottom of the adjusting arm is provided with a through hole corresponding to the rotation hole, the through hole on the adjusting arm is connected to the rotation hole through a connecting bolt and a washer.

3. The multifunctional storage stand of claim 1, wherein the angle positioning mechanism comprises adjusting tooth grooves arranged on an outer edge of the bottom of the adjusting arm along the rotation path of the adjusting arm, a moving hole is correspondingly arranged on the base stand, a clamping block that engages with the adjusting tooth groove is retractably arranged in the moving hole, one end of the clamping block located on an outer side of the base stand is connected to a pressing head, and the other end is connected to a clamping block temporary storage cavity through a plurality of springs.

4. The multifunctional storage stand of claim 1, wherein an inner side of the adjusting arm is provided with a thread groove corresponding to the connecting hole, the connecting hole on the bottom support member is connected to the thread groove through a locking bolt.

5. The multifunctional storage stand of claim 1, wherein the upper inclined support rod is embedded with a tritium tube.

6. The multifunctional storage stand of claim 1, wherein the additional support member comprises a connecting sleeve sleeved on the top connecting rod, the connecting sleeve is connected to a support plate on one side away from the adjusting arms, upper surfaces of the support plate, the bottom support members and the top support members are all equipped with silicone pads.

7. The multifunctional storage stand of claim 1, wherein the top connecting rod and the bottom connecting rod are telescopic rods.

8. The multifunctional storage stand of claim 1, wherein a middle part of the base stand is upwardly provided with a keyboard placement block.

\* \* \* \* \*